United States Patent Office 3,013,883
Patented Dec. 19, 1961

3,013,883
PROCESS FOR CHEMICALLY OPENING BIVALVES
Clyde J. Welcker and Roland L. Welcker, both of 1334 St. Bernard Ave., New Orleans 16, La.
No Drawing. Filed Oct. 17, 1960, Ser. No. 62,829
17 Claims. (Cl. 99—111)

The present invention relates to the process and solutions employed for chemically opening oysters and other mollusks for removal of the edible meats therefrom and is a continuation-in-part of our similarly entitled application Serial No. 5,110, filed January 28, 1960 (now abandoned).

Commercially, oysters are opened by hand, using a knife, mallet, chisel, block or combination of all these tools or knife alone depending upon the technique of the oyster shucker. In the commercial oyster house, the shucker in achieving speed sacrifices quality of workmanship. These oysters may be cut in other places besides in the eye. The oysters which are completely processed by hand are washed and then packed in containers which are refrigerated or frozen. The oysters obtained in this manner are fresh, whole and have lost no weight. The quality of the oysters can approach that of the oysters in restaurants but usually is lower.

Another commercial method is to steam the oysters. The oysters are steamed at temperatures of 240° F. plus, at pressures of 12 p.si.g. plus. The oysters under this form of process are essentially cooked. There is a 60–70% shrinkage in the oysters with an accompanying weight loss. What is really achieved in the steam process is that the adductor muscle elongates through the process of heating. The heat cleaves the protein links and the oysters open. The adductor muscle is still fixed to the shell. The steamed oysters have to go to human shuckers where they are cut from the shells. The shucking operation is very fast for the oysters are already open. By this process very small oysters can be marketed which would be really difficult to completely open by hand. These steamed open oysters are washed and further cooked in the canning process.

The process of the present invention eliminates the manual work that has to be done upon a tightly closed oyster shell when the hand shucking process is employed. It also avoids the shrinkage in the oyster meats which is attendant with the steam process.

Basically, we provide solutions into which the closed oysters may be dumped and within a very short space of time, one to three minutes, the oysters will open their shells and the meat may then be removed therefrom without the method of steaming or manually beating and prying upon the oyster shells. The chemicals in the bath must be acceptable to the oysters so that they will crack their shells open and the oysters will not immediately close and stay closed. The oysters may be made to want to open and to pump water. The chemical changes must be fast acting, non-poisonous and must not alter the physical appearance of the oysters or their taste.

We therefore have developed solutions of varying concentrations of water soluble carbohydrates, non-poisonous and edible for human consumption. We have found that the oysters can be fattened and we have enlarged the oyster body to such an extent that it almost bulges out of the shell. This fattening step takes place with the addition to the solution of polysaccharides which when the salinity of the water is controlled and the water temperature controlled, will result in a quickly fattened oyster.

As the result of our research program with oyster cultivation involving the morphology as well as the physiology of the mollusk, it became evident that oysters can be chemically opened. This chemical method proved to be highly effective, non-toxic and economically feasible. This chemical process for opening oysters resulted through an awareness of the needs and requirements of the oyster and its relationship to its environment. It became obvious that the defenses of the oyster are formidable. Forceful means are met with great resistance by the oyster.

The very conditions that exist to make oysters thrive would have to be a route of attack. Any chemical agent that could be used and result in a marketable oyster meat would have to be consumed by the oyster through the living process. Therefore, the initial response of the oyster to the agent must be favorable and conditions of environment such as to affect body functioning at their highest level. The oyster has to consume the agent and build a concentration of it in the body sufficient to make shell closure (muscle contraction and/or nerve repsonse) difficult or impossible.

In our disclosure, all phraseology and verbs most certainly denote the oyster is alive prior to and during our opening process. Whether the oyster is alive or dead upon removal from shell will be determined by extent to which the process is allowed to continue, concentrations and specific metal ion used. This final status is optional and at the discretion of the operator of the process.

All steps before application of opening process must be in the direction of the preservation of life. The manner in handling should parallel the care and judgment used in transplanting and/or seeding beds to insure greatest yield.

Severe exposure to temperatures above 50° C. must be avoided. Temperatures of a range of the order of 5° C. to 49° C. are operative whereas temperatures of 50° C. or above are lethal to the oyster. Long exposures at 50° C. will result in a 100% kill. Oysters freeze approximately at −2° C. with a cessation of body action. From 5–10° C. body functions and pumping rate is at a minimum. With rising temperatures above 10° C., biological action and pumping increase until approximately 30° C., falling off sharply above this temperature.

Another factor which may injure or even kill an oyster is rough or abusive physical handling. Sudden jarring or tumbling must be avoided to insure rapid and unimpaired reaction of oyster to the opening process. Unnecessary or severe shoveling in freezing weather will kill oysters. Severe tumbling will damage oysters and slow their revival to a normal activity.

Should the jarring be severe enough to kill the oyster, those with the shells in a closed position will stay closed and open only upon decomposition.

In order to best understood the development, it is advantageous to clearly picture the oyster (formerly Ostrea now re-named Grassostrea).

The oyster is a member of the phylum of animals, shellfish, bivalves of the mollusk group, subgroup known as Grassostrea.

The oyster consists of valves (half shells) jointed at the pointed, narrow end by a hinge with a body encased by the valves. Part of the body called the adductor muscle (eye) forms a connective tissue between the two valves.

A portion of the adductor muscle serves as a latch mechanism pulling the two valves together, thus closing the valves. The edges of the valves mate perfectly.

The adductor muscle, when in the contracted state, closes the two valves offsetting the hinge action of keeping them apart due to the ligament orientation and material construction.

The two valves of the oyster are not the same size or shape. The left valve is more deeply concave-convex. It is this left side which is attached to some rock or other material when the oyster first sets. The right valve is more flat and forms a lid or operculum to the stony case formed by the lower valve. The soft parts of the body are lodged in the deep cavity of the lower valve and are covered by the flat operculum.

If an oyster is held sideways with the hinge away from the observer and the flat operculum towards the right hand side, the upper is the dorsal side and the lower the ventral; the posterior end lies toward the observer and the anterior end away from him. Therefore the two valves really represent the right and left sides of the mollusk and consequently the flat operculum is spoken of as the right valve and the large fixed valve as the left valve.

At the narrow or pointed end is a hinge ligament of resilient material, formed like the shells, as an excretion from the living tissues of the oyster. The function of the ligament is to exert force in the direction to affect the opening of the shells. This end of the oyster is referred to as anterior.

The edge of the two valves mate in such a way that the shells are perfectly engaged around the periphery except in the very close proximity of the hinge ligament. The hinge ligament is situated in a void or cavity between the two valves. The position of departure of the line of perfect mating of the two shells to form the ligament cavity serves as a fulcrum or pivotal point for the opening and closing of the shells.

The hinge ligament serves as a spring pulling the two valves together on its side of the pivotal point and the adductor muscle in the contracted state with its greater leverage (greater distance on the posterior side from the pivot) closes the shell.

The action of the hinge ligament is constant in the direction of affecting an opening of the shells. To the best of knowledge, this ligament is at no time under the control of the nervous system and is in tension due to its resilient structural material.

However, the adductor muscle is very much a part of the body of the oyster. It is living tissue considered as part of the anatomy of the body of the oyster receiving a blood supply through a system of arteries and under control of the nervous system.

A closer look at the adductor muscle reveals that it is composed of two masses. In the greater posterior position is the smaller mass referred to as the voluntary muscle, latch muscle, smooth muscle, tetanic or nacreous part. This portion of the adductor muscle keeps the shell closed. It is fast acting and is either in the contracted state or relaxed. Its action is to release the shells for the hinge ligament to open them or to contract and completely offset the action of the ligament.

The voluntary action of the nacreous portion of the adductor muscle is stimulated into fast action (contraction) by the visceral ganglia of the nervous system. Control of the nacreous adductor is through the visceral ganglia.

The larger mass of the adductor muscle immediately adjacent to the smaller portion and anterior to it is the vitreous muscle, slow acting muscle or the involuntary muscle. This portion of the adductor is under the initial stimuli or direction of the cerebral ganglia receiving impulses from nerve cells on the esophageal area, gills, flaps and tentacles sensing for favorable conditions immediately external to the oyster.

The nerve impulses from the cerebral ganglia are directed through the visceral ganglia to control the action of the vitreous muscle to regulate the amount of gape of the oyster.

It has been found that when the positioning of the valves are under the influence of the vitreous adductor muscle there are three distinct shell positions: 1st stage—slightly apart for sensing of condition by cerebral ganglia; 2nd stage—valves midway apart for reduced amount of pumping; and 3rd stage—where shells are greatest apart for maximum pumping of the oyster.

It has been found that when an oyster has its shells closed, its heart does not beat. Biochemical action occurs, energy is consumed and any circulation is through a process of osmo regulation.

In the closed position cell activity continues until it reaches some critical minimum level whence a stimulus is sent to the visceral ganglia releasing or placing the nacreous adductor muscle in a state of relaxation. The shells part or gape.

Emphasis could be placed on the fact that energy is being expanded to keep the adductor muscle in a state of contraction and relaxation must occur for the living oyster to once again build up its food supply so necessary for body function and growth. The shells part upon relaxation. The oyster then pumps water through itself to extract food.

The shell parts and the cerebral ganglia sense the condition of the water for such factors as food content, concentration and dangerous materials or unfavorable conditions. This sensing is done in stage 1 with the valves slightly parted.

Depending upon the biochemical activity level of the oyster, and water conditions, the cerebral ganglia can control whether the shells are farthest apart for maximum pumping or at an intermediate condition.

Any unfavorable external condition sensed by the cerebral ganglia is fed into the visceral ganglia and thence to the nacreous adductor muscle for immediate contraction and valve closure.

Stimuli for valve closure may commence from any part of the body served by the nervous system which would feed into the visceral ganglia not involving the cerebral ganglia. This would be as in the case when the oyster has fed sufficiently.

Since the oyster is sedentary, food must be in the water in close proximity so that by motion of the cilia of the oyster, water is pumped to extract oxygen, minerals and food matter.

Low oxygen and food concentration calls for large quantities of water to be pumped. Conversely, large concentrations call for smaller quantities of water.

Dangerous materials or water conditions result in the oyster closing and staying closed until death and decomposition. The oyster just can't move itself to more favorable water bottoms.

We have found that oysters thrive best in water whose mineral or salinity content is within definite limits, sufficient food to sustain life, well aerated, non-polluted and where water temperatures are sustained long enough in their spawning limits. Water temperatures too great stunt growth and if too high will actually kill oysters.

Each species of oyster has an optimum temperature range for pumping activity which is also indicative of other biological functions such as heart beat rate. We found with the oyster—*Grassostrea virginica*—this activity temperature range was 15–30° C.

The *Grassostrea virginica* will have a specific favorable temperature depending upon the geographical latitude and location they abound in and for the season of the year. The different varieties of Grassostrea will also have a temperature range associated with the specific sub-group for the geographical and seasonal conditions.

It became evident with numerous experiments at different times of the year, different concentrations and temperatures that a certain pattern or underlying requirement gave best results.

What is most desired is for the oyster to open and pump the solution. The conditions should be most favorable to the sensing facilities of the oyster.

We received optimum results when temperatures were within 25–30° C. for *Grassostrea virginica*. The heart beats faster, more water is pumped which resulted in a faster build-up of our desired reagent in the oyster.

The overall salinity of the test solution was held within the optimum salinities for the oyster growing area—1.012 to 1.020 specific gravity hydrometer readings. Any drastic change in the salinity was avoided. The process of the present invention is operative through a salinity range of 1.004 to 1.036 (hydrometer).

We are using the term salinity to refer to total salt content of the water.

In formulating our solutions, we kept in mind the practicalness of using the fresh potable water that may be available in the locale of the operation. For all intents and purposes, municipal water supplies will be considered as fresh water and any dissolved matter negligible. If this should not be the case and the dissolved materials are excessive, then they should be taken into account.

Test solutions in New Orleans, Louisiana were made with city water which is mildly alkaline in pH. Sufficient desired salt was added to give the specific gravity desired. It was found that the use of a specific gravity float or hydrometer gave good correlation with chemical concentration on such basis as normality and ppt.

$MgCl_2$ salt possesses excellent properties in as much as the salt alone need be added to bring the gravity reading into the desired range provided the pH is of the correct value. The addition of a suitable acid or base such as HCl or NaOH respective will modify the pH. $MgCl_2$ additions to New Orleans water did not require any pH correction.

As an example, for a specific gravity reading of 1.020— $MgCl_2$ was slowly dissolved in New Orleans city water to bring it to the proper value by hydrometer reading. The pH remained on the alkaline side and no pH correction was needed.

No greater difficulty was involved with manganese, zinc and calcium chloride.

Where the salt will impart acidic conditions to the solution through hydrolysis depressing the pH below 6.5, slight base (NaOH) is added and aeration controlled to prevent precipitation from solution. For such salts, the limit of solubility will be controlled by pH, degree of aeration and buffering action of the solution.

Acid solution conditions are easily detected in the taste, physical appearance and feel of the oyster. If the $[H^+]$ ion concentration is sufficient in itself to exert hydrolytic action on muscle constituents, the resulting oyster meat is not marketable.

Since it is the aim of our press to achieve the desired results through the action of a multivalent metal ion, it is considered incompatible and non-desirable that the action of $[H^+]$ concentrations be at pH's below a pH of 6.5. It has proved advantageous to have neutral to alkaline solutions in the broad range of 6.5 through 9.5.

For the more active metallic ion (cations) such as aluminum, copper and zinc, their multivalent cation concentration is much smaller than for manganese, magnesium and calcium. Their individual concentrations impart only a fraction of the overall salinity for a favorable condition affecting the oyster. For these salts, the specific gravity has been adjusted by the addition of the monovalent ions from the salt sodium chloride.

The specific gravity of 1.012 to 1.020 represents an optimum range for oysters grown in the Gulf Coast region. This value will change with geographic location and variety of oyster.

Oysters at different times of the year and in different phases of development, will possess a greater or lesser tolerance for salt concentrations. At certain times in the summer and winter the specific gravity of tests reached 1.036.

In practical operations, preliminary tests should be conducted for the specific variety of oyster, state of development and corresponding condition of geographical locale as to give salinity values for optimum time to opening of oysters.

Separate oyster tests with varying salinities established an optimum salinity for the oyster handled.

Excessive concentrations of NaCl or KCl by themselves serve to cause shell closure and death of oyster with accompanying decomposition before shell opening.

To insure a supply of oxygen, the test solutions were aerated using equipment normally found in aquarium systems.

To serve as food, soluble carbohydrates were used. Polysaccharides were most easily obtainable and the following were used. All tested were found acceptable: glucose, dextrin, maltose, dextrose, sucrose (separately and in combination).

Initial tests were conducted with the above mentioned polysaccharides and it finally developed that a proprietary product known as Cartose (a dextrin base commercially employed as a baby food) gave excellent results, was easy to use and gave a solution that looked and smelled like the natural meso-polyhaline waters.

Oysters were kept in solutions of known temperatures, salinity and polysaccharide concentrations to observe their behavior. This was conducted with oysters at different times of the year.

The oysters were placed in separate solutions containing the chloride salts of aluminum, copper, zinc, magnesium, manganese and calcium.

While we have used the term "salt," it will be understood that the word "salt" includes not only the chloride or chlorate of the elements above identified but also includes the sulphate, phosphate, acetate, nitrate, floride and bromide.

This word "salt" is a collective term but it must be soluble in solution. It also must be loosely coordinated.

The element or metal of the salt employed must be soluble and its ions loosely coordinated and capable of stabilizing the pyrophosphate structure of the adductor muscle.

All of the above salts affected opening of the valves and eventually permanent opening of the valves.

For equal concentration, the fastest reactions were with aluminium; then secondly, copper; with zinc very close to it; thirdly, magnesium and manganese. It is our finding that magnesium and manganese reaction rates are very similar. Calcium reacted very slowly and the time for permanent valve opening was many times slower than those for the other reagents.

Upon evaluation of the findings using various salts, tests were conducted to fill in additional data using magnesium chloride ($MgCl_2$) as the active reagent affecting valve opening.

Various concentrations were used to determine magnesium chloride exposure time and the overall effect on the oyster. Beyond a definite concentration, in a pH range of the order of 7.0 to 9.5, the effect is irreversible and the valves stay open and the oysters are killed.

It is noticed that the opening and closing of the oyster becomes very sluggish at low concentrations. The next effect of increased concentration is a prolonged shell opening with very little reflex action remaining in the sensing mechanism of the oyster. If the oyster is taken out of the solution and submerged in a normal solution for oyster cultivation and the shells forced to open and close by pressing of the shells with one's fingers, eventually the adductor muscle revives and the oyster can once again be brought to a normal condition. These concentrations are within the equilibrium life cycle of the oyster.

With the use of magnesium chloride and the polysaccharide, there are no harmful effects to the oyster. It is edible, there are no toxic effects and the oysters were successfully refrigerated. There is no apparent discoloration.

The fastest acting agent aluminum chloride ($AlCl_3$) in sufficient concentrations can literally tear the oyster to pieces. Too strong a concentration of aluminum, zinc, copper and manganese can cause deterioration of oyster body and bloating of gills. If such a concentration exists for magnesium, it was never reached in our tests.

At the time of the year when oysters are very high in glycogen, the polysaccharide could be omitted and the reagent worked alone. At the time of lowest glycogen content, for the same reaction time the polysaccharide proves most useful.

At both times, for equal concentrations, the presence of polysaccharides increases the reaction rate as a time reaction accelerator or opening accelerator and decreases the time required for valve opening.

In the normal state of oyster muscle action, we find in the muscle at the side of myosin a triggering mechanism in which actin plays a prominent role. According to experiences, the resting muscle contains no actomyosin, but contains actin and myosin side by side, kept apart by the subtle balance of attractive and repulsive forces with a slight predominance of repulsion. These repulsive forces are electric and the ATP (linked to myosin) plays with its four negative charges, a leading role. This balance of forces is destroyed, for an instant by excitation whereupon actin and myosin form actomyosin. In the actomyosin thus formed the terminal phosphate bond P—O—P of ATP becomes split and its energy put into action. Relaxation involves the rephosphorlation of the ADP into ATP which, with its four charges restored, pushes actin and myosin apart whereupon the free myosin particles rebuild their water structures and stretch out into filaments again, thus becoming ready for a new contraction.

ATP is adenosine triphosphate. ADP is adenosine diphosphate.

*The ATP molecule*

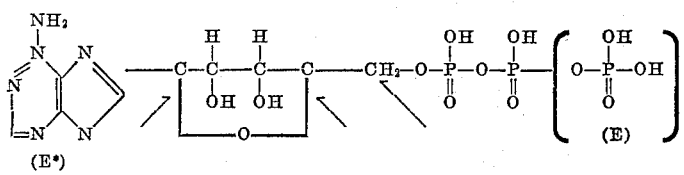

Electron pairs Π electron of conjugated double bond are source of E*
E=chemical bond energy At points where arrows are shown, molecule has ability to change its shape and curl up.

$N^1$ of the $NH_2$ group at position 6 and N at position 7 come into close position to the $O^1$ of the two $OH^1$ units when molecule curls up. This curling up occurs in contraction of muscle.

Myosin is a protein whose molecule is a thin filament. The myosin molecule is proposed to be further divided into meromyosin L and H; L and H standing for light and heavy respectively. The H meromyosin is plumper and upon precipitation, settles faster. It is further proposed that the myosin molecule consists of one H meromyosin and two L meromyosins in a chain.

Actin is a typical globular protein capable of being polymerized from the G (globular) to the F (fiber) actin. Actin, as a proteinous material, is charged more negative than myosin.

The release of the energy of the chemical bond of the P—O—P link (12,000 cal.) is effected through the formation of a magnesium complex with ATP. Magnesium is available from an enzyme substrate. The reactions in a normal muscle are equilibrium reactions. This magnesium complex can be picture as follows:

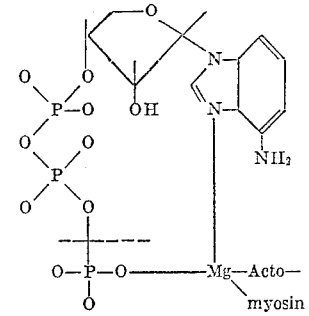

The dotted line indicates the breaking of the P—O—P link.

Rest: Actin+Myosin—ATP!
Excitation: Actomyosin—ATR!r
Contraction: Actomyosin—ATP₀
Relaxation: Actomyosin—ATP ⇌ Actomyosin ADP+Phosphate
Actomyosin—ADP+CP ⇌ Actomyosin—ATP!+C
Actin+Myosin—ATP The energy released during this process is used by the muscle to contract. This breaking of the energy rich phosphate is enzymatically promoted by the magnesium ion which is known to form a stable complex.

When the terminal P—O link is broken and the bond energy released, actomyosin—ADP is formed. The magnesium complexes with the enzyme substrate. In normal muscle action the ADP attached to the contracted actomyosin will attempt to reform ATP by reacting with another molecule of ADP or with a molecule of CP. Only upon the reformation of ATP does the original complex reform, re-establishing the system of actin, myosin—ATP magnesium complex.

When foreign metal ions or additional magnesium ions are introduced in excess over the normal magnesium concentration, this ionic increase will produce an interference with the decomposition of the original actin, myosin ATP complexes. Three phosphate groups containing a total negative charge of four are present in the ATP molecule attached to the enzyme. These negative charges are neutralized by one magnesium ion in the enzyme complex leaving an additional two negative charges which will permit the addition of another magnesium ion.

The additional magnesium ion stabilized the

O—P—O—P—O link through the formation of a pyrophosphate which is known to be a very stable link as shown in the analytical determination as magnesium pyrophosphate. This effectively prevents the breaking of the terminal P—O—P bond and the release of its bond energy under normal conditions. Since this bond is not broken and no energy is released, muscle contraction will not occur. The muscle will remain in its relaxed state.

Pyrophosphate form complexes of the type $M^{II}(P_2O_7)=$ with divalent ions such as magnesium and complexes of the type $M^{III}(P_2O_7)^-$ and $M^{III}(P_2O_7)_2^{-5}$ with such metals as aluminum. These groupings can be represented as:

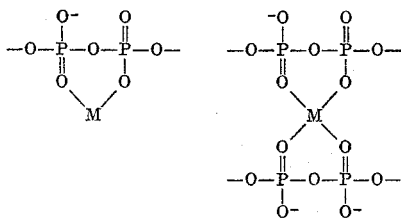

The formation of a chelate ring of six atoms adds to the stability of the grouping.

Magnesium in water solution is present as the hydrated magnesium ion and its structure and environment is completely different from that of the ATP which contains a sugar group. The presence of this dissimilar medium makes it difficult for the magnesium ion to enter into that part of the cell where the enzyme mechanism occurs. However, if magnesium is in a slight alkaline medium where its positive charge has been slightly decreased due to the presence of complexed hydroxyl groups, it is now possible to complex this magnesium hydroxy complex with sugar or sugar-like molecules such as polysaccharides.

In the presence of these complexing agents, the entrance of the complexed magnesium into the enzymatic process becomes vastly accelerated. The Mg ATP complex becomes destroyed by further complexing with the magnesium polysaccharide complexes.

However, in the enzymatic cycle magnesium can also be introduced without adding polysaccharides because in certain seasons of the year, the oyster itself is known to be high in glycogen, a polysaccharide which can form similar complexes with magnesium hydroxy complexes. Because the complex ion formation has to occur in the oyster itself, the entrance in the enzymatic cycle becomes much slower. Thus muscle relaxation will occur much slower also.

The magnesium ion can also affect the enzyme cycle (an equilibrium process) in that increases of the concentration on the product side will increase the stability of the reactants, shifting the equilibrium to the left.

$$ATP + Enzym \rightleftharpoons Enzym\text{-}Photphat + ADP$$

This would then stabilize the ATP complex and prevent the formation of ADP and thus decrease the release of energy needed for muscle contracture.

The magnesium ion can interact with myosin in the resting muscle by increasing the positive charge of the myosin and thereby decreasing the tendency for the actomyosin to form. Magnesium hydroxy polysaccharide complexes with the myosin giving a slight increase in the repulsive forces stabilizing the myosin and actin as separate entities and thereby preventing the formation of the actomyosin Mg ATP complexes.

The effect of metal ions in interfering with the enzyme actions of the ATP—ADP processes is a function of the size and charge of the metal ion. This size and charge is well known to be a major factor in the complexing ability of most metal ions. Group 1–A elements have little or no effect on the enzyme process and are not specific for any of the processes which were described above. Polyvalent ions with a size larger than magnesium in group 2–A seem to belong in the same group as the group 1–A elements. Metal ions other than these two groups, however, would all interfere with all of the processes mentioned, but the rate and extent of interference would differ markedly from metal ion to metal ion, depending first upon its size and second upon its charge. For magnesium, relatively large amounts which can very easily and very correctly be analytically determined are needed to bring about the relaxation of the muscle. All other metal ions which produce similar effects need much smaller amounts introducing a larger uncertainty in the exact determination of the desired concentration.

Since relatively large amounts are necessary in the case of magnesium to bring about a relaxation phenomenon under equilibrium conditions, it is thus easily possible to eliminate the interference of the magnesium ion with the enzyme process equilibrium. The normal process of relaxation and contracture due to ATP—ADP decomposition and the subsequent release of the high energy phosphate is then re-established.

If the equilibrium is pushed by adding extra amounts of metal ion, the formation of the actomyosin ATP Mg complex is primarily interfered with and the oyster will die. The amount of metal ion necessary to bring about this death will vary from metal ion to metal ion for the reasons expressed above and very small highly charged metal ions such as Al (111) and Be (11) will do this in exceedingly small concentrations.

This method of opening oysters has proven 100% effective, on all sizes and shapes. The inherent property of the utilization of glycogen enables this process to be used to process the oyster most economically and justifiably at the time of the year the oysters are the largest and have the greatest food value.

With the shells thus opened, the oysters are easily removed by knife without danger of cutting the body and incurring weight loss due to bleeding. Such an overall operation of chemically opening and hand shucking the opened oysters is very rapid. This is considering that a manual operation is to follow the chemical operation.

As previously stated, the oyster is in no manner physically altered by treatment with magnesium chloride singly or with polysaccharide. The same cannot be stated for the present mass production of steaming where there is terrific shrinkage and weight losses as high as 70%.

When the chemical method is compared to the mechanical shock method, there is a 100% efficiency of opening for the chemical with no mutilation as compared to uncertain efficiencies of opening and possible shredding of oyster with the shock method. It must be stated that in the shock method, oysters that have died with their adductor muscle fully contracted begin to gape only when the muscle disintegrates.

Although we have disclosed herein the best forms of the invention known to us at this time, we reserve the right to all such modifications and changes as may come within the scope of the following claims.

What we claim is:

1. The process of chemically opening bivalve mollusks comprising placing the mollusks in an aqueous solution of a salt of the metal of the group of aluminum, copper, calcium, magnesium, manganese and zinc having a solution specific gravity of the range of 1.004 to 1.036 having available metallic ions of the elements set forth above loosely complexed for entering into cell reaction in the mollusks, maintaining the temperature of the solution within the range of 5° C. to 49° C., and maintaining the pH of the solution within a range of the order of 6.5 to 9.5 to open the mollusks.

2. The process of claim 1 further comprising the additional step of adding water soluble polysaccharides to the solution as a time reaction accelerator.

3. The process of claim 1 further comprising the additional step of adding a polysaccharide of the group of glucose, dextrin, maltose, dextrose and sucrose as a time opening accelerator.

4. The process of opening bivalve oysters of the species *Grassostrea virginica* comprising placing the oysters in an aqueous solution of a salt of the metal of magnesium having a solution specific gravity of the range of 1.012 to 1.020 having available metallic ions of magnesium loosely complexed for entering into cell reaction in the oysters, maintaining the temperature of the solution within the range of 15° C. to 30° C., and maintaining the pH of the solution within a range of the order of 7.0 to 9.5 to open the oyster.

5. The process of claim 4 further comprising the step of adding water soluble polysaccharides to the solution as a time reaction accelerator.

6. The process of opening oysters of the species *Grassostrea virginica* comprising placing the oysters in an aqueous solution of a salt of the metal of aluminum having a solution specific gravity of the range of 1.012 to 1.020 having available metallic ions of aluminum loosely complexed for entering into cell reaction in the oysters, maintaining the temperature of the solution within the range of 15° C. to 30° C., and maintaining the pH of the solution within a range of the order of 7.0 to 9.5 to open the oysters.

7. The process of claim 6 further comprising the additional step of adding water soluble polysaccharides to the solution as a time reaction accelerator.

8. The process of opening oysters of the species *Grassostrea virginica* comprising placing the oysters in an aqueous solution of a salt of the metal of copper having a solution specific gravity of the range of 1.012 to 1.020 having available metallic ions of copper loosely complexed for entering into cell reaction in the oysters, maintaining the temperature of the solution within the range of 15° C. to 30° C., and maintaining the pH of the solution within a range of the order of 7.0 to 9.5 to open the oysters.

9. The process of claim 8 further comprising the additional step of adding water soluble polysaccharides to the solution as a time reaction accelerator.

10. The process of opening oysters of the species *Grassostrea virginica* consisting of placing the oyster in an aqueous solution of a salt of the metal of calcium having a solution specific gravity of the range of 1.012 to 1.020 having available metallic ions of calcium loosely complexed for entering into cell reaction in the oysters, maintaining the temperature of the solution within the range of 15° C. to 30° C., and maintaining the pH of the solution within a range of the order of 7.0 to 9.5 to open the oysters.

11. The process of claim 10 further comprising the additional step of adding water soluble polysaccharides to the solution as a time reaction accelerator.

12. The process of opening oysters of the species *Grassostrea virginica* comprising placing the oysters in an aqueous solution of a salt of the metal of manganese having a solution specific gravity of the range of 1.012 to 1.020 having available metallic ions of manganese loosely complexed for entering into cell reaction in the oysters, maintaining the temperature of the solution within the range of 15° C. to 30° C., and maintaining the pH of the solution within a range of the order of 7.0 to 9.5 to open the oysters.

13. The process of claim 12 further comprising the additional step of adding water soluble polysaccharides to the solution as a time reaction accelerator.

14. The process of opening oysters of the species *Grassostrea virginica* comprising placing the oysters in an aqueous solution of a salt of the metal of zinc having a solution specific gravity of the range of 1.012 to 1.020 having available metallic ions of zinc loosely complexed for entering into cell reaction in the oysters, maintaining the temperature of the solution within the range of 15° C. to 30° C., and maintaining the pH of the solution within a range of the order of 7.0 to 9.5 to open the oysters.

15. The process of claim 14 further comprising the additional step of adding water soluble polysaccharides to the solution as a time reaction accelerator.

16. The process of chemically opening bivalve Grassostrea comprising placing the Grassostrea in an aqueous solution of a salt of the metal of the group of aluminum, copper, calcium, magnesium, manganese and zinc having a solution specific gravity of the range of 1.004 to 1.036 having available metallic ions of the elements set forth above loosely complexed for entering into cell reaction in the Grassostrea, maintaining the temperature of the solution within the range of 5° C. to 49° C., and maintaining the pH of the solution within a range of the order of 6.5 to 9.5 to open the Grassostrea.

17. The process of claim 16 further comprising the additional step of adding water soluble polysaccharides to the solution as a time reaction accelerator.

References Cited in the file of this patent

UNITED STATES PATENTS

| | | |
|---|---|---|
| 2,041,727 | Prytherch et al. | May 26, 1936 |
| 2,824,005 | Strasburger | Feb. 18, 1958 |